2,949,438
Patented Aug. 16, 1960

2,949,438

FILM-FORMING COMPOSITIONS COMPRISING CARBOXY-COPOLYMERS AND POLYEPOXIDES AND METHOD OF MAKING SAME

Darrell D. Hicks, Louisville, Ky., assignor to Devoe & Raynolds Company, Inc., a corporation of New York No Drawing. Filed Nov. 4, 1957, Ser. No. 694,119

8 Claims. (Cl. 260—45.5)

This invention pertains to the production of thin films for use in coating compositions, adhesives, and the like. More particularly, the invention relates to film-forming compositions based on carboxy-copolymers and polyepoxides.

In my copending applications Serial No. 694,105, filed November 4, 1957, and Serial No. 694,122, filed November 4, 1957, copolymers of vinylidene compounds, and half esters or diacid esters of butenedioic acids such as maleic, are reacted with polyepoxides in the absence of a solvent. Many maleic half ester-vinylidene monomer reactions yield products that are of constant composition and molecular weight, but in solvent-free systems contemplated by the inventions of Serial No. 694,105 and Serial No. 694,122 the ratio of vinylidene compound to partial ester can be varied somewhat to give a variety of compositions for reaction with the polyepoxides.

In general, however, maleyl compounds show a reaction selectivity that favors the alternating one to one type of copolymer. And when solvents are employed, products formed from ratios other than one to one result in films showing signs of incompatibility when the copolymer is reacted with the polyepoxide. In coatings applications, laminates, adhesives, and the like, when copolymer solutions of maleic esters and vinylidene compounds are made using other than one to one ratios, thin films produced by reaction with polyepoxides are unsuitable. In accordance with this invention, it has been found that if lower alkyl esters of acrylic or methacrylic acid, or mixtures thereof, are employed in conjunction with butenedioic acid half esters such as maleic half esters, one to one ratios need not be used and copolymers having various weights per carboxyl group can be prepared which when combined with glycidyl polyethers in the presence of a solvent, form films which are compatible. The resulting films when used as coatings are superior in practically all respects to the widely used alkyd resins. They have very good flexibility, hardness, adhesion, and alkali resistance properties. They are more flexible and less soluble than similar films made using styrene or vinyl toluene without lower alkyl acrylates or methacrylates.

Half esters employed with lower alkyl acrylate or methacrylate to prepare carboxy copolymers are made by reacting one mol of butenedioic acid or anhydride with one mol of a monohydric alcohol having from one to twelve carbon atoms. Included are alcohols which are either primary, secondary or tertiary in character, for example, methyl, ethyl, isopropyl, normal butyl, secondary butyl, tertiary butyl, tertiary amyl, lauryl, dodecyl, 2-ethyl hexanol, cyclopentyl, cyclohexyl, benzyl, phenylethyl, furfuryl, etc. The invention also includes mixtures of alcohols. Ether alcohols are also intended, for example, 2-hydroxypropyl phenylether, 2-ethoxy ethanol, 2-butoxy ethanol, and commercially available alcohol ethers such as ethylene glycol phenylether, propylene glycol phenylether, ethylene glycol para-tertiarybutyl phenylether, propylene glycol ethyl ether, propylene glycol methyl ether, dipropylene glycol methyl ether, and tripropylene glycol methyl ether. The invention thus contemplates monohydric aromatic and aliphatic alcohols containing only carbon, hydrogen and oxygen, free of oxygen-containing groups other than ether oxygen and hydroxyl groups.

By butenedioic acid is meant an unsaturated dibasic acid of the formula: HOOCCR:CRCOOH, where R is a hydrogen or methyl substituent. Included are cis-butenedioic acid (maleic acid), trans-butenedioic acid (fumaric acid), methyl butenedioic acid (citraconic acid), and mesaconic acid. It is noted, however, that the anhydride, where it exists, is preferred for use in the preparation of the half ester.

The lower alkyl esters of acrylic acid or methacrylic acid which can be copolymerized with the monohydric alcohol-butenedioic acid half ester include such esters as ethyl acrylate, methyl acrylate, propyl acrylate, isopropyl acrylate, etc. By lower alkyl is meant alkyl radicals of not more than ten carbon atoms.

In preparing the film-forming compositions of this invention, because of the volatility of acrylates and methacrylates and their consequent loss at elevated temperatures, it is preferred to prepare the half ester-acrylate, or methacrylate, copolymer before the polyepoxide is brought into the reaction. The butenedioic acid half ester thus is copolymerized with the lower alkyl acrylate or methacrylate in the presence of a solvent and the polyepoxide is subsequently incorporated in the copolymer solution to form the film-forming composition of the invention. Methods of polymerizing such monomers are well known. Polymerization is effected by conventional methods, generally by solution polymerization techniques, at temperatures from 15° C. to 130° C. and in some cases, if desired, at a pressure slightly above atmospheric. The polymerization is, of course, accelerated by the use of heat and other conditions such as a peroxide catalyst, e.g., benzoyl peroxide, cumene hydroperoxide, ditertiary butyl peroxide, etc. The polymerization, as indicated, is achieved in the presence of a solvent or inert diluent. Suitable solvents for this purpose are ketones, esters and ethers. It will be appreciated, of course, that these solvents should be non-reactive with an epoxide or an anhydride; in other words, they should be free of hydroxyl and carboxyl groups. It will also be appreciated that solubility will differ with various members of this group. Desirable solvents are ketones, for example, acetone, methyl ethyl ketone, methyl isobutyl ketone, diisobutyl ketone, etc.; and "Cellosolve" derivatives (glycol ethyl ether derivatives) such as "Cellosolve" acetate (hydroxyethyl acetate), the diethyl ether of ethylene glycol; and mixtures of ketones and "Cellosolve" derivatives with aromatic hydrocarbons such as xylene, toluene, benzene, etc. Some of the longer chained monomers are, of course, soluble in the aromatic hydrocarbon.

For the purpose of this invention, the butenedioic acid half ester and the lower alkyl acrylate or methacrylate are copolymerized in such ratios as to give copolymers containing fifteen to seventy parts by weight of half ester of butenedioic acid and from thirty to eighty-five parts of the lower alkyl ester, the total parts being one hundred.

Any of the known polyepoxides can be employed in the preparation of the thermosetting compositions of this invention. Useful polyepoxides are glycidyl polyethers of both polyhydric alcohols and polyhydric phenols, epoxidized fatty acids or drying oil acids, epoxidized diolefins, and epoxidized di-unsaturated acid esters, as well as epoxidized unsaturated polyesters, so long as they contain more than one epoxide group per molecule.

Glycidyl polyethers of polyhydric phenols are made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4 - hydroxyphenyl)ethane, and 1,5-dihydroxynaphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to 1, up to around 10 to 1.

While the invention is applicable to epoxides generally, preferred polyepoxides are glycidyl polyethers of aromatic polyhydric compounds having weights per epoxide group of 180 to 2000. Glycidyl ethers of polyhydric alcohols are also well known. These polyepoxides are made by reacting at least about two mols of an epihalohydrin with one mol of a polyhydric alcohol such as ethylene glycol, pentaerythritol, etc., followed by dehydrohalogenation according to U.S. Patent 2,581,464.

In addition to polyepoxides made from alcohols or phenols and an epihalohydrin, polyepoxides made by the known peracid method are also suitable. Epoxides of unsaturated esters, polyesters, diolefins, and the like can be prepared by reacting the unsaturated compound with a peracid. The reaction is one of epoxidation of compounds with isolated double bonds, at a temperature sufficiently low so that the acid resulting from the peracid, for example, acetic acid in the case of peracidic acid, does not react with the resulting epoxide group to form hydroxyl groups and ester linkages. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters are prepared by reacting unsaturated aldehydes with butadiene to form unsaturated cyclic aldehydes. These can be condensed by the Tischenko reaction to form esters or reduced to form alcohols which can be subsequently reacted with acids to form esters.

In addition to epoxidized drying oils, butadiene dioxide and monomeric esters, polymeric esters can also be epoxidized by the peracid method as described in Australian Patent 11,862, 1955. Examples of these unsaturated polyesters are those made from unsaturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanedial-1,3, pentaerythritol, etc. Other polyesters which can be epoxidixed with peracetic or other peracids are made from saturated acids and unsaturated alcohols, for example, 2-butenediol-1,4, 1,5-hexanediene-3,4-diol, 2-pentene-1,5-diol, cyclohexenediol-2,5, etc., reacted with such saturated acids or acid anhydrides as malonic, succinic, glutaric, terephthalic, etc.

As indicated hereinbefore, the polyepoxide or polyepoxide solution is mixed or blended with the alkyl acrylate or methacrylate half ester copolymer solution. Films prepared from this solution are cured to form thermoset compositions having outstanding characteristics. In the thermosetting composition, the polyepoxide is usually present in a ratio of about one epoxide group per carboxyl group of copolymer. However, the ratio can be 0.7 to 2 epoxide groups of polyepoxide per carboxyl group of copolymer. Usually not more than two epoxide groups are used since the cost of the composition is increased thereby.

Heat curing or thermosetting of the films cast from these film-forming compositions can be carried out simply by means of a heat treatment at temperatures of 120° C. to 200° C. for periods of ten to thirty minutes depending on the temperature. Carboxy-epoxy catalysts in many instances are desirable, and since they are not entirely necessary the amount used will depend on results desired. As a general rule, the catalyst is used in an amount of from 0.5 to 10 percent by weight based on the film-forming composition. Any of the known catalysts which are activators for epoxy-carboxy reactions can be used. These epoxy-carboxy catalysts are well known in the art. They are usually basic materials, for example, amines, amine salts, quaternary ammonium hydroxides or salts such as quaternary ammonium salts. However, since primary and secondary amines enter into the reaction, preferred catalysts are tertiary amines, tertiary amine salts, and quaternary ammonium compounds, e.g., quaternary ammonium hydroxide, and quaternary ammonium salts. Examples are trimethyl amine, dimethylethyl amine, triethyl amine, ethyl dipropyl amine, benzyltrimethyl ammonium hydroxide, benzyltrimethyl ammonium chloride, benzyltrimethyl ammonium acetate, benzyltriethyl ammonium formate, tripropylbenzyl ammonium chloride, ethyl pyridine chloride, benzyl dimethyl ammonium hexoate, alpha-methylbenzyldimethyl ammonium 2-ethyl hexoate, etc.

The invention thus contemplates a film-forming composition which includes a copolymer of fifteen to seventy parts of a half ester of a butenedioic acid and a monohydric alcohol of not over twelve carbon atoms containing only hydrogen and oxygen, and free from oxygen-containing groups other than ether oxygen and hydroxyl groups, and from thirty to eighty-five parts of a lower alkyl ester of acrylic acid or methacrylic acid, the total parts being one hundred, in admixture with a polyepoxide in a ratio of 0.7 to 2 epoxide groups of polyepoxide per carboxyl group of copolymer. The term film-forming composition is not intended to be limited to coatings applications but rather to any of the various uses to which thin films of this type are applied. The invention thus contemplates thin films used for bondings, adhesives and laminates, as well as in coatings applications. Such modifications will occur to one skilled in the art. Accordingly, it is not intended that the invention be limited to coatings applications illustrated in the following examples.

EXAMPLE 1

*Preparation of half ester*

| Material | Parts | Mol Ratio |
|---|---|---|
| Methyl Alcohol | 32.0 | 1 |
| Maleic Anhydride | 98.0 | 1 |

A methyl alcohol-maleic anhydride half ester with a weight per carboxyl group of 130 is prepared by heating the methyl alcohol and maleic anhydride at a temperature of 125° C. in a one liter three-necked flask equipped with an agitator, thermometer and reflux condenser. Since the reaction is exothermic, care is exercised during the course of this reaction which is about forty-five minutes, to maintain the reaction temperature at approximately 125° C. by cooling if necessary. A quantitative yield (130.0 parts) of the half ester results.

*Preparation of carboxyl-containing copolymer*

| Material | Parts | Weight Percent |
|---|---|---|
| Methyl alcohol-Maleic Half Ester | 130.0 | 32.5 |
| Methyl Acrylate | 270.0 | 67.5 |
| Benzoyl Peroxide | 8.0 | |
| Xylene | 100.0 | |
| Methyl Isobutyl Ketone | 200.0 | |

To the methyl alcohol-maleic half ester, prepared as in the preceding paragraph, is added the methyl acrylate, a portion (6.0 parts) of the benzoyl peroxide, 37.5 parts of the xylene and 37.5 parts of the methyl isobutyl ketone, the mixture being agitated until all of the benzoyl peroxide is in solution.

In a one liter three-necked flask fitted with an agitator, thermometer, reflux condenser and dropping funnel, 37.5 parts of the xylene and 137.5 parts of the methyl isobuytl ketone are heated to 115° C. after which the half ester-acrylate solution is introduced to the flask by means of the dropping funnel at such a rate as to maintain reflux. When this addition is complete, after about eight hours, the flask contents are held at reflux for an additional half hour, whereupon the remainder (2.0 parts) of benzoyl peroxide dissolved in 25.0 parts of the xylene and 25.0 parts of the methyl isobutyl ketone are added gradually to the reaction mixture by means of the dropping funnel, maintaining reflux throughout the addition. After this addition is complete, the flask contents are cooled. The resulting methyl acrylate/methyl alcohol/maleic half ester copolymer solution has a solids content of 47.8 percent (as determined by heating for two hours at 150° C.). The copolymer has a weight per carboxyl group of 400 (based on solids).

EXAMPLE 2

Other carboxyl-containing copolymers are prepared from alcohol-maleic half esters and methyl acrylate following the procedure of Example 1, the half esters in each case being the reaction product of one mol of the alcohol per one mol of the anhydride. The table which follows indicates the amounts of reactants used in the preparation of the copolymers and the carboxyl equivalents of the corresponding copolymers (based on 100 percent solids).

TABLE—EXAMPLE 2

| Copolymer No. | Alcohol (Maleic Half Ester of) | Half Ester (Weight Percent) | Methyl Acrylate (Weight Percent) | Copolymer (Weight Per Carboxyl) |
|---|---|---|---|---|
| 1A | Methyl | 32.5 | 67.5 | 400 |
| 1B | ----do---- | 21.7 | 78.3 | 600 |
| 1C | ----do---- | 16.3 | 83.7 | 800 |
| 2A | Butyl | 43.0 | 57.0 | 400 |
| 2B | ----do---- | 32.5 | 67.5 | 530 |
| 2C | ----do---- | 28.7 | 71.3 | 600 |
| 2D | ----do---- | 21.7 | 78.3 | 793 |
| 2E | ----do---- | 21.5 | 78.5 | 800 |
| 2F | ----do---- | 16.3 | 83.7 | 1055 |
| 3A | Capryl | 57.0 | 43.0 | 400 |
| 3B | ----do---- | 38.0 | 62.0 | 600 |
| 3C | ----do---- | 28.5 | 71.5 | 800 |
| 4A | Ethyl Hexyl | 57.0 | 43.0 | 400 |
| 4B | ----do---- | 38.0 | 62.0 | 600 |
| 4C | ----do---- | 28.5 | 71.5 | 800 |
| 5A | Ethylene Glycol Phenyl Ether | 59.0 | 41.0 | 400 |
| 5B | ----do---- | 39.3 | 60.7 | 600 |
| 5C | ----do---- | 29.4 | 70.6 | 800 |
| 6A | Propylene Glycol Phenyl Ether | 62.5 | 37.5 | 400 |
| 6B | ----do---- | 41.6 | 58.4 | 600 |
| 6C | ----do---- | 31.2 | 68.8 | 800 |
| 7A | Propylene Glycol Methyl Ether | 47.0 | 53.0 | 400 |
| 7B | ----do---- | 31.4 | 68.6 | 600 |
| 7C | ----do---- | 23.5 | 76.5 | 800 |

EXAMPLE 3

*Preparation of polyepoxide*

About 536 parts (2.35 mols) of bisphenol and 211 parts (5.17 mols) of sodium hydroxide (ten percent excess) are combined in 1900 parts of water and heated to about 23° C., whereupon 436 parts (4.70 mols) of epichlorhydrin are added rapidly. The temperature is increased and remains at about 90° C. to 100° C. for one hour and forty minutes. The mixture separates into a two phase system and the aqueous layer is drawn off. The resinous layer that remains is washed with hot water and is then drained and dried at a temperature of about 140° C. The Durrans' mercury method melting point of the resulting product is 50° C. and the weight per epoxide is 325.

*Preparation of cured film*

The carboxyl-containing copolymers of Examples 1 and 2, which are in solution, are blended in various ratios with a seventy-five percent xylene solution of the polyepoxide of this example. These blends are thinned to forty percent solids content with a 50/50 mixture of xylene and 2-ethoxyethanol acetate. From these solutions, films are drawn down on glass plates with a three

TABLE—EXAMPLE 3

| Copolymer No. | Copolymer, Wt. percent | Epoxide Wt. percent | Film Properties ||||
|---|---|---|---|---|---|---|
| | | | Hardness | Flexibility | Mar Resistance | Adhesion |
| 1A | 52 | 48 | Very Good | Good | Very Good | Very Good. |
| 1B | 64 | 36 | Good | Very Good | ----do---- | Do. |
| 1C | 77 | 23 | ----do---- | Excellent | ----do---- | Do. |
| 2A | 52 | 48 | ----do---- | Greater than 1C | ----do---- | Do. |
| 2B | 56 | 44 | ----do---- | Greater than 2A | ----do---- | Do. |
| 2C | 62 | 38 | ----do---- | Greater than 2B | ----do---- | Do. |
| 2D | 67 | 33 | ----do---- | Greater than 2C | ----do---- | Do. |
| 2E | 69 | 31 | ----do---- | Greater than 2D | ----do---- | Do. |
| 2F | 77 | 23 | ----do---- | Greater than 2E | ----do---- | Do. |
| 3A | 51 | 49 | Fair | Excellent | Good | Do. |
| 3B | 61 | 39 | ----do---- | ----do---- | ----do---- | Do. |
| 3C | 68 | 32 | ----do---- | ----do---- | ----do---- | Do. |
| 4A | 50 | 50 | ----do---- | ----do---- | ----do---- | Do. |
| 4B | 63 | 37 | ----do---- | ----do---- | ----do---- | Do. |
| 4C | 71 | 29 | ----do---- | ----do---- | ----do---- | Do. |
| 5A | 58 | 42 | Very Good | Good | ----do---- | Do. |
| 5B | 70 | 30 | Good | Excellent | ----do---- | Do. |
| 5C | 75 | 25 | ----do---- | ----do---- | ----do---- | Do. |
| 6A | 45 | 55 | Very Good | Good | ----do---- | Do. |
| 6B | 60 | 40 | Good | Excellent | ----do---- | Do. |
| 6C | 66 | 34 | ----do---- | ----do---- | ----do---- | Do. |
| 7A | 49 | 51 | Fair | ----do---- | ----do---- | Do. |
| 7B | 61 | 39 | ----do---- | ----do---- | ----do---- | Do. |
| 7C | 68 | 32 | ----do---- | ----do---- | ----do---- | Do. | mil blade and are baked for twenty minutes at 200° C. Clear, well cured films result.

The preceding table indicates the weight percent composition (based on 100 percent solids) of the film-forming solutions and the physical properties of the corresponding cured films.

EXAMPLE 4

As set forth in Example 3, films of the blends of carboxyl-containing copolymers of Example 2 and the polyepoxide prepared in Example 3 are rolled onto 3" x 5" electrolytic tin panels with a gelatin roller and are cured by heating for twenty minutes at 200° C. These films, with identical compositions of those of the table of Example 3, are subjected to a "wedge bend test." In this test the panel is bent over a mandrel to form a ⅛" bend with the planes of the panel on each side of the bend now being parallel to each other ⅛" apart. The bent panel is then subjected to impact while being held in a wedge, so that the planes touch at one end and are ⅛" apart at the other end forming a tapered or wedge bend. The bend of the film is then examined for breakage, the length of the break being measured in mm.

The films are also subjected to an impact test with a Gardner Variable Impact Tester which uses a ½" round nosed steel rod weighing two pounds dropping a distance of 28". After impact, the films are examined for flaking or cracking.

In addition, Pyrex test tubes, the bottoms of which are coated with cured films of these compositions, are immersed in a five percent solution of sodium hydroxide to determine the duration of the resistance of the films to alkali. The length of time the films are immersed until film failure is observed is reported in hours. The table of this example indicates the results of these tests on films of identical composition to those of Example 3.

TABLE—EXAMPLE 4

| Film of Copolymer No. | "Wedge Bend Test," mm. Breakage | Impact Test | Alkali Resistance, Hours |
|---|---|---|---|
| 1A | 25 | Passed | >60 |
| 1B | 35 | Failed | >60 |
| 1C | Failed ⅛" bend | do | 2 |
| 2A | 35 | do | 9 |
| 2C | 45 | do | 9 |
| 2E | 50 | do | 2 |
| 3A | 40 | do | 35 |
| 3B | 35 | do | |
| 3C | 50 | do | |
| 4A | 30 | Passed | 25 |
| 4B | 50 | Failed | 5 |
| 4C | 60 | do | 35 |
| 5A | 35 | Passed | 9 |
| 5B | 25 | do | |
| 5C | 35 | do | |
| 6A | 40 | do | 25 |
| 6B | 50 | Failed | |
| 6C | Failed ⅛" bend | do | 5 |
| 7A | 40 | Passed | |
| 7B | Failed ⅛" bend | do | 9 |
| 7C | do | Failed | 5 |

EXAMPLE 5

Preparation of polyepoxide

In a reaction vessel fitted with a stirrer, thermometer and condenser, about 650 parts (2.85 mols) of 2,2-bis-(4-hydroxyphenyl)propane and 218 parts (5.45 mols) of sodium hydroxide (twenty percent excess) are combined in 1900 parts of water and heated at about 29° C. for twenty minutes, whereupon 414 parts (4.48 mols) of epichlorhydrin are added rapidly. The temperature of the mixture is increased over a period of fifteen minutes to 93–100° C. and is held at this temperature for one hour and thirty-five minutes. The mixture separates into a two phase system and the aqueous layer is drawn off. The remaining resinous layer is washed with hot water and then is drained and dried at 140° C. The Durrans' mercury method melting point of the resulting polyepoxide is 70° C. and the weight per epoxide is 475.

Preparation of cured films

In a suitable container, 11.2 parts of a 66.7 percent solution of the polyepoxide of this example in xylene and 17.2 parts of a seventy percent solution of copolymer 4C of Example 2 in xylene are blended with 11.6 parts (sufficient to produce a forty percent solids solution) of methyl isobutyl ketone. This composition represents 38.5 weight percent of the polyepoxide and 61.5 weight percent of copolymer. From this solution, a film is drawn down on a glass plate with a three mil blade and is baked at 200° C. for twenty minutes. The cured film is clear and very smooth, possesses excellent flexibility, hardness, adhesion and mar resistance.

To a 20.0 part portion of a blend of identical composition is added as a catalyst, 0.04 part of dimethylaminomethyl phenol. A three mil film of this solution drawn down on a glass plate and baked for thirty minutes at 150° C. exhibits excellent toughness, flexibility, and adhesion and good mar resistance.

To another 20.0 parts of identical composition is added, as catalyst, 0.08 part of dimethylaminomethyl phenol. A three mil film drawn down on a glass plate and baked for thirty minutes at 150° C. has outstanding toughness, adhesion and flexibility.

EXAMPLE 6

A film-forming composition is prepared by combining, in a suitable container, 25.3 parts of a 59.3 percent solution of copolymer 4B of Example 2 (weight per carboxyl group of 600) in xylene, 5.0 parts of a commercially available polyepoxed having the formula:

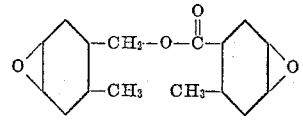

9.7 parts of a 50/50 mixture of xylene and methyl isobutyl ketone and, as a catalyst, 0.2 part of dimethylaminomethyl phenol. This composition represents seventy-five weight percent of copolymer 4B and twenty-five weight percent of polyepoxide. From this solution, a two mil film drawn down on a glass plate and baked for thirty minutes at 150° C. possesses excellent flexibility and adhesion.

EXAMPLE 7

Preparation of polyepoxide

In a reaction vessel equipped with agitator, thermometer and condenser, about 276 parts (3 mols) of glycerol are mixed with 832 parts (9 mols) of epichlorhydrin. To this reaction mixture are added 10 parts of diethyl ether solution containing about 4.5 percent boron trifluoride, according to U.S. Patent 2,581,464. The temperature of this mixture is held between 50° C. and 75° C. for about three hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for nine hours. After cooling to room temperature, the insoluble material is filtered from the reaction mixture and low boiling substances are removed by distillation to a temperature of about 150° C. at 20 mm. pressure. The resulting polyglycidyl ether is a pale yellow viscous liquid containing between two and three epoxide groups per molecule. It has a weight per epoxide of 155.

Preparation of cured films

In a suitable container, 25.8 parts (seventy-five weight percent based on the reactants) of a 58.3 percent xylene solution of copolymer 2C of Example 2 (carboxyl equivalent of 600) and 5.0 parts (twenty-five weight percent) of the polyepoxide of this example are combined in the presence of 4.2 parts of methyl isobutyl ketone and 5.0 parts of xylene (sufficient solvent to obtain a fifty percent solids solution). In addition, as a catalyst, 0.2 part of dimethylaminomethyl phenol is added. From this solution a film is drawn down on a glass plate with a two mil blade and is baked for thirty minutes at 150° C. The cured film is clear, has excellent flexibility, adhesion and mar resistance, and fair hardness properties.

A two mil film of the same solution drawn down on an electrolytic tin panel and baked for thirty minutes at 150° C. exhibits only slight breakage when subjected to the impact test described in Example 4.

EXAMPLE 8

In a suitable container, 7.0 parts of a 55.5 percent solution of copolymer 2A of Example 2 (weight per carboxyl group of 400) in xylene are combined with 9.14 parts of a forty percent solution (in a 60/40 mixture of 2-ethoxyethanol acetate and xylene) of a polyepoxide (weight per epoxide of 333) with this structure:

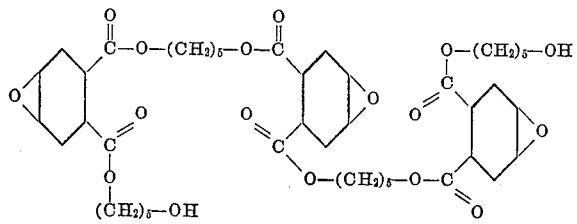

This composition represents 48.5 weight percent of polyepoxide and 51.5 weight percent of copolymer 2A based on solids. To this mixture is added 0.12 part of a sixty percent aqueous solution of benzyltrimethylammonium chloride. A film of the blend is drawn down on a glass plate with a three mil blade and is baked at 125° C. for one hour. The resulting cured film is clear, has good color, and possesses good adhesion and flexibility.

EXAMPLE 9

In a suitable container, 9.9 parts of the polyepoxide of Example 3 (as a seventy-five percent solution in xylene) and 21.3 parts of copolymer 4B of Example 2 (as 59.3 percent solution in xylene) are combined with 5.0 parts of 2-ethoxyethanol acetate and 13.8 parts of xylene (sufficient solvent to obtain a forty percent solution) and 0.33 part of a sixty percent aqueous solution of benzyltrimethylammonium chloride. This composition represents 37.0 weight percent of polyepoxide and 63.0 weight percent of copolymer 4B (based on solids). A film of this solution, drawn down on a glass plate with a three mil blade and baked for thirty minutes at 150° C., is well cured, tough and flexible.

EXAMPLE 10

A composition, capable of forming films is prepared by combining in a suitable container, 10.4 parts of the polyepoxide of Example 3 (as a seventy-five percent solution in xylene), 20.1 parts of copolymer 7B of Example 2 (as a 60.7 percent solution in xylene) with 7.0 parts of 2-ethoxyethanol acetate and 12.5 parts of xylene (sufficient solvent to obtain a forty percent solution) and 0.33 part of a sixty percent aqueous solution of benzyl-trimethylammonium chloride. This composition represents thirty-nine weight percent of polyepoxide and sixty-one weight percent of copolymer 7B (based on solids). From this solution a film is drawn down on a glass plate with a three mil blade and is cured by baking for thirty minutes at 150° C. The cured film possesses excellent flexibility and adhesion, has good mar resistance and fair hardness properties.

While this invention in its primary aspects relates to improved compositions prepared from lower alkyl acrylates or methacrylates and certain half esters such as butyl maleate, it has been found that with the lower alkyl acrylate present even vinyl aromatic hydrocarbon can be used with results better than obtainable with vinyl aromatics without lower alkyl acrylates. While it is still somewhat better to use one mol of half ester per mol of vinyl aromatic hydrocarbon, compatible films are obtainable with polyepoxides when one or less to thirty-five percent of the lower alkyl acrylate or methacrylate is replaced with the vinyl aromatic hydrocarbon. In addition, even when the half ester and vinyl aromatic hydrocarbon are used in a one to one ratio, the composition of the resulting copolymer can be varied by virtue of the use of the lower alkyl acrylate or methacrylate. The following examples illustrate the use of a vinyl aromatic hydrocarbon in this system. Preferred vinyl aromatic hydrocarbons are styrene and vinyl toluene.

EXAMPLE 11

In accordance with the procedure of Example 1, carboxyl-containing copolymers are made from alcohol-maleic half esters and methyl acrylate, with the addition of vinyl toluene. The table which follows enumerates the proportions of half ester, vinyl toluene and methyl acrylate used in preparing the copolymers and the carboxyl equivalents of the corresponding copolymer (based on 100 percent solids).

TABLE—EXAMPLE 11

| Copolymer No. | Alcohol (Maleic Half Ester Of) | Half Ester (Weight Percent) | Vinyl Toluene (Weight Percent) | Methyl Acrylate (Weight Percent) | Copolymer (Weight Per Carboxyl) |
|---|---|---|---|---|---|
| 8A | Butyl | 21.6 | 14.8 | 63.7 | 800 |
| 8B | do | 28.7 | 19.7 | 51.6 | 600 |
| 8C | 2-Ethyl Hexyl | 38.0 | 19.7 | 42.3 | 600 |
| 8D | do | 28.5 | 14.8 | 56.7 | 800 |
| 8E | Propylene Glycol Methyl Ether | 23.6 | 14.6 | 61.8 | 800 |

EXAMPLE 12

Following the procedure of Example 3, from the carboxyl-containing copolymers of Example 11 and the polyepoxide prepared in Example 3, film-forming compositions are prepared. From these compositions, films are drawn down on glass plates and are cured by baking at 200° C. for twenty minutes.

The table of this example indicates the weight percent composition (based on 100 percent solids) and the properties of the corresponding cured films.

TABLE—EXAMPLE 12

| Copolymer No. | Copolymer, Wt. percent | Epoxide, Wt. percent | Film Properties | | | |
|---|---|---|---|---|---|---|
| | | | Hardness | Flexibility | Mar Resistance | Adhesion |
| 8A | 69.9 | 30.1 | Very Good | Very Good | Very Good | Very Good. |
| 8B | 63.9 | 36.1 | do | do | do | Do. |
| 8C | 72.1 | 27.9 | Good | do | Good | Do. |
| 8D | 77.3 | 22.7 | do | do | do | Do. |
| 8E | 66.8 | 33.2 | do | do | do | Do. |

What is claimed is:

1. A process for the preparation of insoluble, infusible, alkali-resistant films which comprises mixing (1) a polyepoxide selected from the group consisting of glycidyl polyethers of polyhydric alcohols and phenols, and epoxidized esters, polyesters, drying oils, diolefins and cyclic aldehyde condensates each having at least two epoxy groups, and (2) a solution of a carboxy copolymer formed from thirty to eighty-five parts by weight of (a) an alkyl ester of a monounsaturated monocarboxylic acid wherein the alkyl group has no more than ten carbon atoms and wherein the monocarboxylic acid is selected from the group consisting of acrylic acid and methacrylic acid, and fifteen to seventy parts by weight, the total being one hundred, of (b) an acid ester of a butenedioic acid and a saturated monohydric alcohol of not over twelve carbon atoms, said alcohol containing only carbon, hydrogen and oxygen and being free of oxygen-containing groups other than ether and hydroxyl groups, the ratio of (1) to (2) being 0.7 to 2 epoxide equivalents polyepoxide per carboxy equivalent copolymer, considering an epoxide equivalent polyepoxide as the weight of polyepoxide in grams per epoxide group and a carboxyl equivalent copolymer as the weight of copolymer in grams per carboxyl groups, forming a film of said polyepoxide-copolymer solution, and heating the film to evaporate the solvent and bring about a reaction of the copolymer with the polyepoxide to cure the film.

2. The process of claim 1 wherein the reaction is carried out in the presence of a carboxy-epoxy catalyst selected from the group consisting of tertiary amines and their salts, quaternary ammonium hydroxide and quaternary ammonium salts.

3. The process of claim 1 wherein one to thirty-five percent of the alkyl ester is replaced with a vinyl aromatic hydrocarbon selected from the group consisting of vinyl benzene and alkyl vinyl benzene.

4. The process of claim 1 wherein the butenedioic acid half ester is a monoalkyl maleate, having from one to eight carbon atoms in the alkyl group, wherein the alkyl ester is methyl acrylate, and wherein the polyepoxide is a glycidyl polyether of a dihydric phenol having a 1,2-epoxy equivalency greater than one and a weight per epoxide not exceeding 600.

5. The process of claim 1 wherein the butenedioic acid half ester is the ester formed by the reaction of one mol of a monoether of a glycol with one mol of maleic acid, wherein the alkyl ester is methyl acrylate, and wherein the polyepoxide is a glycidyl polyether of a polyhydric alcohol having a 1,2-epoxy equivalency greater than one and a weight per epoxide not exceeding 600.

6. The process of claim 4 wherein the monoalkyl maleate is methyl maleate and wherein the polyether is a glycidyl polyether having a weight per epoxide not exceeding 350.

7. The process of claim 5 wherein the monoether-maleic half ester is ethylene glycol phenyl ether and wherein the polyether is a glycidyl polyether having a weight per epoxide not exceeding 350.

8. A film forming composition comprising (1) a polyepoxide selected from the group consisting of glycidyl polyethers of polyhydric alcohols and phenols, and epoxidized esters, polyesters, drying oils, diolefins and cyclic aldehyde condensates each having at least two epoxy groups, and (2) a solution of a carboxy copolymer formed from thirty to eighty-five parts by weight of (a) an alkyl ester of a monounsaturated monocarboxylic acid wherein the alkyl group has not over ten carbon atoms and wherein the monocarboxylic acid is selected from the group consisting of acrylic acid and methacrylic acid, and fifteen to seventy parts by weight, the total being one hundred, of (b) an acid ester of a butenedioic acid and a saturated monohydric alcohol of not over twelve carbon atoms, said alcohol containing only carbon, hydrogen and oxygen and being free of oxygen-containing groups other than ether and hydroxyl groups, the ratio of (1) to (2) being 0.7 to 2 epoxide equivalents polyepoxide per carboxy equivalent copolymer, considering an epoxide equivalent polyepoxide as the weight of polyepoxide in grams per epoxide group and a carboxyl equivalent copolymer as the weight of copolymer in grams per carboxyl group.

References Cited in the file of this patent

UNITED STATES PATENTS

| | | |
|---|---|---|
| 2,642,414 | Bauer et al. | June 16, 1953 |
| 2,826,562 | Shokal | Mar. 11, 1958 |
| 2,908,663 | Masters | Oct. 13, 1959 |

FOREIGN PATENTS

| | | |
|---|---|---|
| 734,848 | Great Britain | Aug. 10, 1955 |